March 22, 1938.  H. SALVATORI  2,111,643
SEISMOMETER
Filed Dec. 31, 1935   3 Sheets-Sheet 1

INVENTOR
Henry Salvatori
BY George L. Parkhurst
ATTORNEY

Patented Mar. 22, 1938

2,111,643

UNITED STATES PATENT OFFICE 2,111,643

SEISMOMETER

Henry Salvatori, Hollywood, Calif., assignor to Western Geophysical Company, Tulsa, Okla., a corporation of Delaware Application December 31, 1935, Serial No. 57,069

17 Claims. (Cl. 177—352)

This invention relates to a detector of seismic waves or what is commonly known as a seismometer.

With similar objects in view, a number of devices of this nature have been used in the past. These may be roughly classified as:

(a) Mechanical devices such as are usually used for recording natural earthquake waves;

(b) Electrostatic devices in which the space between two condenser plates is varied by the earth movements;

(c) Piezo-electric devices in which crystals having piezo-electric properties are stressed by the earth movements, thus generating electric currents;

(d) Bolometer devices in which bellows actuated by seismic waves force air currents past bolometers, thereby varying the bolometer potentials;

(e) Electromagnetic devices of the moving coil variety, in which the position of a coil or coils relative to a magnetic field of substantially constant strength is varied by the earth movements, causing a cutting of magnetic lines of force by the coil or coils thus generating electric currents or potentials therein; and (f) Electromagnetic devices in which the reluctance of a magnetic circuit is varied by earth movements, and the resultant variable fluxes are interlinked with electric coils in which corresponding electric currents or potentials are generated.

Similar devices can, of course, be used to detect and/or record disturbances, vibrations or movements in any type of material with which they are in contact and are not confined to the study of natural or artificial earthquakes. However, an object of my invention is to produce a seismometer which, while susceptible to other uses, is particularly adapted to the art of seismic surveying in which artificial earthquakes are generated by means of an explosive or otherwise and the resulting seismic waves after refraction and/or reflection from sub-surface formations are detected by seismometers. The seismometers generate electric currents corresponding to the seismic waves impinging on them and these electric currents, after suitable amplification, are transmitted to oscillograph elements, the movements of which are recorded on a moving photographic strip.

In this kind of work, seismometers of the variable reluctance type mentioned in (f) above have usually been found most useful and it is to this type of seismometer that my invention is directed.

The objects of my invention and the construction and method of operation of my new seismometer can best be understood by describing them in connection with the accompanying drawings, which form a part of this specification and in which like letters and numerals indicate like or corresponding parts.

In the drawings:

Figures 1, 2, and 3 are diagrammatic elevational views

Figures 1, 2, 3:
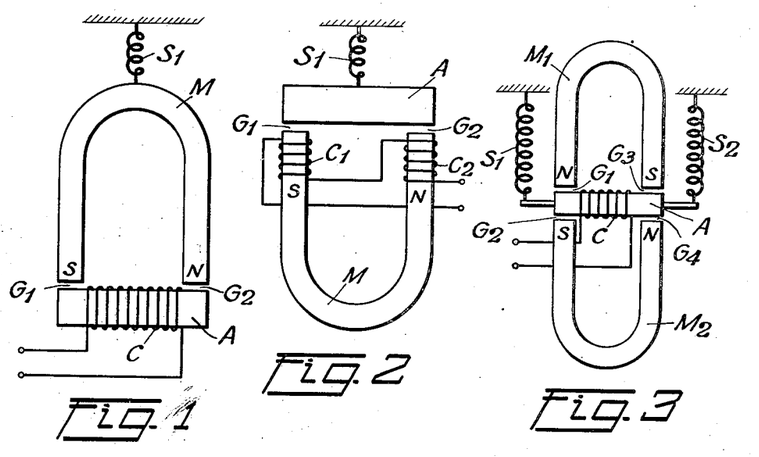

The simplest form of variable reluctance electromagnetic seismometer is that shown in Figure 1. Here a permanent magnet M, having a north pole N and a south pole S, is supported by a spring $S_1$ immediately above an armature A which is surrounded by a coil C. The armature A as well as the upper end of the spring $S_1$ is fastened to the frame of the seismometer (not shown). When a motion is imparted to the frame of the seismometer, the armature A moves with the frame while the permanent magnet tends to remain stationary in space due to its inertia. Therefore, the lengths of the air gaps $G_1$ and $G_2$ are varied in accordance with the impressed motion.

Of course forces are also applied to the mass of the magnet through the spring and as the inertia of this member is not infinite, a motion will also be imparted to it. However, if the natural frequency of the combination of the spring and the magnet differs widely from that of the impressed frequency and if the moving system is highly damped, the motion of the inertia member will be small in comparison to that applied to the frame of the device, and will be out of phase with the applied motion by an amount depending upon the constants of the seismometer and the frequency of the applied motion. The lengths of the air gaps $G_1$ and $G_2$ will therefore actually vary as the difference between these two motions.

The total flux flowing through the magnetic circuit at a given instant is dependent primarily upon the magnetomotive force of the magnet divided by the reluctance of the magnetic circuit which includes the two air gaps $G_1$ and $G_2$. Therefore, as these gaps are varied by an impressed seismic force, the reluctance of the magnetic circuit is varied with a consequent increase or decrease in the flux flowing in the magnetic circuit. The resultant change of flux generates an electric potential in the coil C which is linked with the magnetic circuit.

As the response or output of this device is a resultant of the difference in motion of the case and the inertia member (in this example the permanent magnet), the sensitivity of the instrument will be somewhat affected by the natural frequency of the inertia member, especially when the natural frequency is near that of the applied force.

The natural frequency of the inertia member depends upon the ratio of the stiffness of the suspension to the mass of the inertia member, in this case the magnet. This can be expressed algebraically by the formula:

$$F = \frac{K}{2\pi}\sqrt{\frac{S}{M}}$$

where S=stiffness of suspension, pounds per inch deflection;
M=mass of magnet, poundals; and
K=a constant for any one seismometer involving the seismometer dimensions and conversion factors.

Now the restoring forces in addition to the spring suspension also include the magnetic forces acting upon the mass which are in opposition to the spring forces, and these must be subtracted from the spring forces in computing the natural frequency, so that the modified formula for the natural frequency of the arrangement shown in Figure 1 becomes:

$$F = \frac{K}{2\pi}\sqrt{\frac{S - \left(5.55 \times 10^{-8}\frac{\phi^2}{A_g l_g}\right)}{M}}$$

where S=stiffness of suspension, pounds per inch deflection;
M=mass of magnet, poundals;
$\phi$=flux across the air gaps, lines;
$A_g$=area of air gaps, square inches;
$l_g$=average length of air gaps, inches; and
K=a constant for any one seismometer involving the seismometer dimensions and conversion factors.

The theory of a seismometer of this type is discussed at some length by Hugo Benioff in the bulletin of the Seismological Society of America, volume 22, No. 2, June, 1932.

As far as I am aware all seismometers of this class hitherto used in seismic prospecting are of the same generic type, that is, the reluctance of the magnetic circuit is varied by causing the lengths of the air gaps in such circuits to vary in accordance with variations in the impressed seismic waves. Certain modifications in movable members, fixed members and placement of electric coils are, however, often made.

For example, the seismometer shown in Figure 1 would be equally effective were the magnets fastened so as to move with the case or frame of the seismometer and the armature suspended by means of one or more spring members as in Figure 2. Furthermore, the coil can be placed around any portion of the magnetic circuit, for instance around the magnet itself. Often the coil is divided into two sections $C_1$ and $C_2$ and placed on the ends of the magnet as shown in Figure 2. This arrangement is especially adapted to cases where the armature is used as the inertia member.

Another modification of the same general type of instrument makes use of two permanent magnets $M_1$ and $M_2$ placed on opposite sides of the armature, as shown in Figure 3. In this variety of instrument the coil can be placed on the armature or on the end of a magnet pole, or divided and placed on any combination of two or more pole tips in such manner that the potentials or currents generated in each coil add throughout the total coil circuit. Likewise, the main moving element can be either the armature or the two magnets. As shown in Figure 3 the armature is suspended by two springs $S_1$ and $S_2$. It is evident that the change of flux causing the electric phenomena in the coil is due directly to variations in the lengths of the air gaps between the pole faces and the armature.

Figures 4, 5, 6, 7:
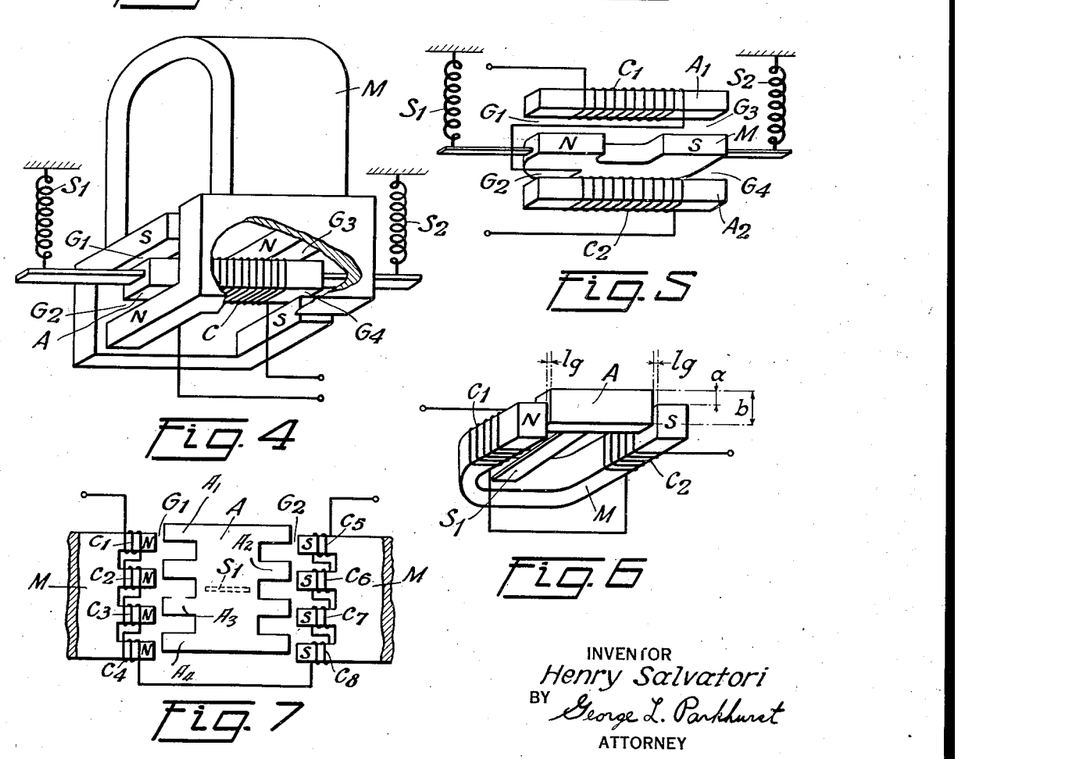
Figures 4 and 5 are diagrammatic isometric views, illustrating certain prior art seismometers, the description of which will make the nature of my invention more apparent.
Figure 6 is a diagrammatic isometric view illustrating one specific embodiment of my invention.
Figures 7, 8, 9, and 10 are diagrammatic elevational views illustrating four additional specific embodiments of my invention.

One magnet can be used to form more than two pole tips. One example of such an arrangement is shown in Figure 4. Here by the use of specially shaped pole pieces (one of which is shown partially broken away) in connection with a single magnet, there are two north and two south pole tips around the armature, i. e., one north and one south pole at each end of the armature. The operation of this seismometer resembles that of the type shown in Figure 3 in that the flux through the armature is the resultant of the effects of two sets of magnetic poles, but is different in that the increase in flux through the magnet due to decrease in lengths of one pair of gaps is equal to the decrease in flux due to the increase in length of the other pair of gaps, so that while the armature flux varies, the flux through the permanent magnet is substantially constant.

Another modification of this variable length of gap type is illustrated in Figure 5, in which two armatures $A_1$ and $A_2$ and one magnet M are used. Either the two armatures or the permanent magnet is spring mounted, and seismic disturbances produce relative motion between the armatures and magnet. The two coils $C_1$ and $C_2$ are connected in such manner that the potentials or currents of both coils add throughout the complete coil circuit. The operation of this type of seismometer still depends upon variations in the lengths of the air gaps due to seismic waves.

Before proceeding to a discussion of the seismometers which I have invented, some discussion of the disadvantages of the prior art seismometers and of the problems encountered in the operation of these prior art seismometers will be in order.

In seismometer design and use it is often desirable to vary the natural frequency of the inertia members. This natural frequency of vibration varies with the ratio of the stiffness of the suspension to the mass of the movable members. The expression for the natural frequency of one type of variable length of gap seismometer has already been given. In any form of variable length of gap instrument, there will always be an unbalancing magnetic pull on the armature or armatures as soon as there is relative displacement of the armature or armatures and magnet or magnets from the equilibrium position, or in other words, as soon as there is a variation in the lengths of the air gaps. This magnetic force will be opposed to the force due to the spring suspension, so that in the expression for the natural frequency of the seismometer the effective stiffness of suspension will be less than that due to the spring. The amount of this decrease in the stiffness of suspension is dependent upon the design of the magnetic elements of the seismometer. Now in order to change the natural period of the seismometer, three different methods of variation are possible as follows:

First, the mass of the inertia member can be altered. Such a change is limited in effectiveness on the one hand by the available space on the inertia element in which extra mass can be placed, and on the other hand by the decrease in flux in the inertia element as this part is reduced in size, since there is a minimum flux which will produce the required potential or current in the seismometer coils, as will be recognized by those skilled in this art.

Second, the flux density can be changed, which results in an alteration of the effective stiffness of the suspension (see the complete expression for natural frequency of a seismometer given on a previous page). A considerable decrease in natural frequency is difficult to obtain by this means due to the limitations on the amount of flux that can be obtained from the magnetomotive force of a permanent magnet acting on a given armature, and a considerable increase in natural frequency is limited by the minimum allowable flux density necessary to produce suitable voltage in the coils. This method is seldom used.

Third and finally, the actual stiffness of the spring suspension can be changed. This method allows a considerable increase in natural frequency, but frequency decrease is limited. If a weak spring is used, "sticking" may result, or in other words, there may be sufficient magnetic pull upon small displacement to overcome the spring force and hold the armature against the magnet. This fact is of great importance in seismometer design. Again, practical difficulty is experienced in adjusting the frequencies of a number of seismometers to the same natural frequency if the spring suspension stiffness is low. In this case the effect of the magnetic pull on the effective suspension is appreciable, and a small variation in either the lengths of the air gaps or the magnetomotive forces of the magnets, either of which may commonly occur in practice, will vary the natural frequency to a considerable extent.

In commercial practice it is sometimes desirable to keep the natural frequency of seismometers low (as low as ten cycles per second), and difficulty is often experienced in obtaining a design with great enough mass and low enough suspension stiffness to realize the requisite low frequency without "sticking".

It is a general object of my invention to provide an electromagnetic seismometer of the variable reluctance type which does not operate on the principle of variation of length of gap, which can be adjusted for a low natural frequency, and which offers several advantageous features not incorporated in previous seismometers. Other and more detailed objects will become apparent as the description proceeds.

The operation of the seismometer of my invention depends upon the generation of electric voltages by the variation of magnetic flux linking a coil or coils due to a change in the reluctance of the magnetic circuit, this change being caused by the variation in cross-sectional area of one or more gaps in the magnetic circuit. These gaps are of non-magnetic material, usually air or oil, and are of constant length. The variation in cross-sectional area of the gaps is a direct result of the relative motion between the seismometer case and the inertia member.

Figure 6 illustrates a simple form of my invention, and will be used to explain the principle of operation. The seismometer consists essentially of an armature A of ferro-magnetic material, a permanent magnet M, (an electro-magnet can be used) and two coils $C_1$ and $C_2$ linking the magnetic circuit formed by the armature and magnet. The magnet and armature are so constrained that practically no movement tending to alter the lengths of the gaps (marked $l_g$) can occur. The lengths of the air gaps $l_g$ are small compared to the dimensions of the pole faces of the magnetic elements. The magnet M is rigidly mounted in the frame or case of the seismometer (not shown). The armature A is suspended directly or indirectly from the frame by a flat spring suspension $S_1$. When a motion is imparted to the frame of the seismometer the armature A tends to remain stationary in space while the magnet M moves with the frame. The resultant relative motion varies the cross-sectional area of the gaps and therefore varies the reluctance of the magnetic path comprising the armature, the magnet, and the two air gaps. This variation in reluctance changes the total magnetic flux through this path and hence generates voltage in the coil or coils linking this flux. This potential or the resultant current can be detected and/or recorded in any of the conventional manners. Thus, the response of the seismometer is the direct result of the relative movement of case and armature.

Exactly the same operation can be secured if the magnet is spring suspended and the armature is rigidly fastened to the case or frame of the instrument. In either type, the inertia member can be provided with means for changing its rest position with relation to the poles without altering the lengths $l_g$ of the gaps, or, in other words, means for varying the dimension "$a$" shown in Figure 6. A second adjustment can be provided in order to vary the lengths of the gaps by a shifting of the ends of the fixed element in a direction normal to the plane of the ends of the pole faces in order to obtain equal gap lengths of the desired size.

The resultant motion of the seismometer parts due to seismic waves is affected by the natural frequency of the inertia element in the same way as in the variable length of gap seismometer. However, there is a very important distinction between the two types of instrument. The effective stiffness of the spring suspension of the movable element in the variable length of gap seismometer is affected by the magnetic pull between magnet and armature. In the variable area seismometer of my invention this magnetic pull has little influence on the effective spring suspension, because the chief component of magnetic attraction between elements is at right angles to the spring force. The component of attraction affecting the suspension is less than 7% of that affecting the suspension in the variable length of gap type as I have shown by measurements made on two instruments with equivalent dimensions. These measurements were, furthermore, made using a greater relative displacement of inertia element than could possibly occur in the field use of the instrument. For this reason, the natural frequency of the seismometer can be adjusted to a low value by using a relatively weak spring suspension and an inertia element of reasonably large mass. The two difficulties encountered with the variable gap seismometer when a weak spring is used, viz. possible sticking of moving (or inertia) element to fixed element, and variation in effective spring suspension among a number of seismometers due to variation in magnetomotive force of the several magnets, are almost completely overcome. Since the inertia element, which is free to move with respect to the case or frame of the seismometer, is constrained from moving in the direction of the stationary element, sticking cannot occur, even if a fairly weak spring is used. This may be stated as the paramount advantage of the variable area seismometer.

Furthermore, since the effective spring suspension is very nearly independent of the magnetic effects between elements, an appreciable change in the magnetic properties of the parts will cause very little change in the natural frequency of the seismometer. Because of this, adjustments in the natural frequency can be made without the possibility of having to change the magnetic flux density. Thus, variations in the natural frequency of a variable area seismometer can be secured with much more ease than in a variable length of gap instrument.

In a seismometer such as that shown in Figure 6, the elements must be made of such size and the inertia element must be suspended in such manner that the maximum motion due to seismic disturbances will not be sufficient to cause the cross-sectional area of the gaps to reach its maximum possible value while the relative motion is still occurring. In other words, the dimension "$a$" shown in Figure 6 must be greater than the maximum possible relative displacement of the armature due to seismic forces. If this were not so, the direction of the E. M. F. induced in the coils would suddenly reverse at the instant that dimension "$a$" reversed in direction—i. e., at the instant that the top edge of the armature moved below the top edges of the pole tips. In other words, the pole faces of the magnet and the armature must always be partially out of line with each other.

The dimension ($b-a$) shown in Figure 6 must also be greater than the maximum possible relative displacement in order to prevent the armature from moving entirely out from between the pole faces at the other extremity of the motion. Either of these two possibilities would lead to a distorted output wave. Thus it may be stated that the effective cross-sectional area of the gap must never be reduced to zero and must never reach its maximum possible value during normal operation.

A further advantage is realized in my invention in that air gaps much shorter than those necessary with the variable length of gap type of instrument can be used with no danger of sticking. For this reason the average reluctance of the magnetic circuit of the variable area type can be made considerably lower than is practical in the variable length of gap type of seismometer.

Another advantage resulting from my type of construction can be seen from the following analysis. In the variable length of gap type of instrument the effective cross-sectional area of the gap is substantially constant, and the change of flux results in a change of flux density in the faces of the elements. In the variable area instrument the change in flux due to motion of the elements is accompanied by a corresponding change in the effective area of the gap, consequently the flux density in the pole faces of the elements remains relatively constant. Variation of the flux density in the pole faces is disadvantageous because the reluctance of the iron portion of the magnetic circuit does not vary in direct ratio to the flux density. Any variation of reluctance of this sort which is not directly proportional to the relative motion of the elements will produce distortion in the resultant electric wave, so that it no longer remains a true indication of the seismic disturbance.

Another form of my invention has important additional advantages over the variable length of gap type of seismometer. It is possible to increase very materially the voltage or current generated by the simpler form of my invention (Figure 6) by constructing the seismometer in what might be called a multiple unit or composite type. One simple form of composite instrument is shown diagrammatically in Figure 7. As can be seen from that figure it consists of a magnet M (shown only in part) having a plurality of north poles N and a plurality of south poles S. Each magnet pole has a corresponding armature pole. The armature is mounted as an inertia member by means of spring $S_1$, as in Figure 6. In effect the seismometer of Figure 7 is a composite of a plurality of seismometers of the type shown in Figure 6. Each magnet pole is spaced from the corresponding armature pole. This spacing can be of air or some other non-magnetic material. The relative dimensions of each individual gap can be the same as in the single seismometer. The pick-up coils $C_1$, $C_2$, $C_3$, etc. can be placed on the pole-tips of the magnet as shown in Figure 7, or on the poles of the armature, or on both, and can be connected in series or parallel or a combination of both. The gap adjustment and adjustment for displacing the movable elements parallel to the plane of the pole faces are identical in type with those described for the single seismometer. This multiple type operates equally well if the armature is fixed and the magnets are spring suspended. The advantages previously claimed for the single type seismometer apply equally well to the multiple type.

One additional advantage of the multiple unit variable area seismometer has already been mentioned. That is, that a seismic wave producing a definite motion of the armature of a multiple unit seismometer having N units will generate N times as much potential in the coils as a single element seismometer for the same relative motion between armature and magnet. Thus, it will reproduce a seismic wave having 1/N the motion reproducible by a single unit instrument.

It may be granted that the same potential could be generated by a single unit seismometer having N times the number of turns. However, the inductance of these coils would be $N^2$ as much as the inductance of the coil of a normal single element seismometer, by the ordinary laws of electric induction. The inductance of the coils of the multiple type seismometer having N coils connected in series is only N times as much as the inductance of the coil of the normal single element instrument. Thus the increase in sensitivity in the multiple type instrument is gained with less increase in inductance than if a single element instrument were wound for that increase in sensitivity. Since low inductance is often of importance in seismometer operation, it is obvious that the multiple type seismometer with coils connected in series is more advantageous for use where high sensitivity is required than is a single unit seismometer having the same sensitivity.

Figure 8:
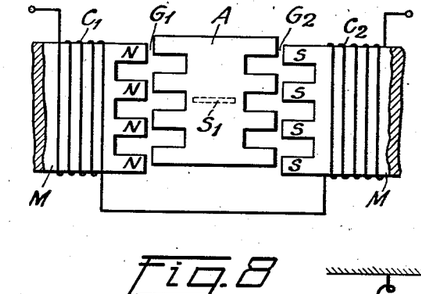

Precisely the same operation can be secured by the use of a multiple unit seismometer of the type shown diagrammatically in Figure 8 in which the coils $C_1$ and $C_2$ are placed on the body of the magnet instead of on the poles. Here a sensitivity N times as great as that of a normal single unit seismometer (Figure 6), is obtained with the same number of turns used in the single unit instrument. The total variation of gap area is N times as great as that of the single unit seismometer. The inductance of the coils of this type of seismometer is the same as the inductance of the multiple unit type of Figure 7 for equal sensitivity. This instrument is adjusted in the same manner as the above mentioned types, and has the same advantages they have. As in the previously mentioned types, the armature can be fixed to the case and the magnet or magnets spring supported without changing the principles of operation.

Figure 9:
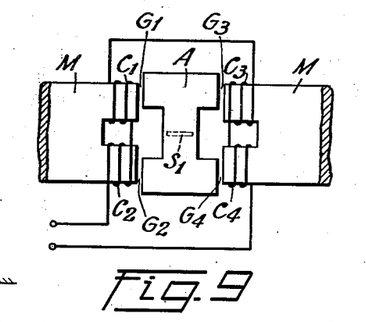

A further modification can be used in order to eliminate more completely the effect of magnetic attraction on the parts of the multiple armature. This is done by arranging the sections or poles of the armature in such manner that the component of magnetic force in each armature section which is in the direction of the spring force is equalized in the steady state by an equal and opposite component of magnetic force on another section of the armature. This principle is illustrated by Figure 9, which shows a diagram of a double armature and magnet. The center line of the lower poles of the armature is placed a certain distance below the center line of the lower set of magnet pole faces and the center line of the upper poles of the armature is placed this same distance above the center line of the upper set of magnet pole faces. This may be referred to as a symmetrical arrangement. If the pole strength of each section of the magnet is equal, there is practically no resultant magnetic force in the direction of motion of the armature, much less than that present in types 6, 7, and 8 having equivalent diamensions. As previously stated, the forms shown in Figures 6, 7, and 8 have a maximum magnetic pull in the direction of the relative motion between armature and magnet which is in the neighborhood of 7% of the direct magnetic pull. It will thus be seen that the form shown in Figure 9 eliminates even the most remote possibility of "sticking".

The principle of Figure 9 can be extended to any even number of armature sections. It should be noticed that in this type of seismometer there is no change in total flux threading the magnet, since the decrease in flux through one set of north-south pole tips due to a seismic wave is balanced by the increase in flux through the other set of pole tips. A further advantage is the elimination of electrical phenomena due to changes in stray fields traversing the seismometer. The coils are wound in such a way that a change in stray field will produce opposing phenomena in the two identical coils on each pole, thus giving no resultant effect on the output of the pick-up coils.

In speaking of Figures 7, 8, and 9 I have referred to the armature as a single armature. In effect, however, it is a plurality of armatures ($A_1$, $A_2$, $A_3$, and $A_4$ in Figure 7)—one for each pair of magnet poles—fastened together to move in unison or otherwise mounted so as to have fixed positions relative to each other. In the appended claims I refer to each of these effective armatures as an "armature element" and it is to be understood that these various armature elements can be formed from one piece of magnetic material as shown in Figures 7, 8, and 9 or can be independent elements mounted so as to preserve fixed positions relative to each other.

Figure 10:
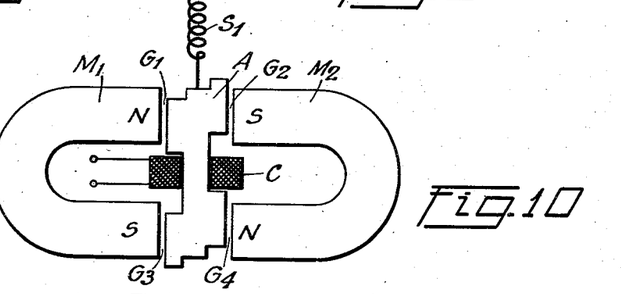

Still another variety of seismometer of the constant-length variable-area gap type is illustrated diagrammatically in Figure 10. In this type of seismometer the change of flux activating the coil is the sum of the changes in the two fluxes flowing through the center of the armature due to the two magnets shown. The magnets $M_1$ and $M_2$ are rigidly attached to the case, and the armature is suspended by spring $S_1$ in the diagram shown. When the armature moves upward with respect to the magnets, the flux through the armature due to the left hand magnet $M_1$ increases (due to increased area of the air gaps $G_1$ and $G_3$) while the flux due to the right hand magnet $M_2$ decreases (due to decreased area of the air gaps $G_2$ and $G_4$). Since the two fluxes are opposite in sense due to the arrangement of the magnetic poles as shown, the change in flux through the armature is twice that due to either magnet, presuming that the arrangement is symmetrical and the magnetomotive forces of the two magnets are identical. For this reason, the instrument of Figure 10 using an armature coil C of N turns will generate as much voltage as the instrument of Figure 6 using 2N turns, provided the total magnetomotive force of the magnets in each arrangement is the same and the corresponding dimensions of the elements are equal. In order to make the seismometer of Figure 10 as sensitive as that shown in Figure 9, twice the turns used on one coil in Figure 9 must be wound on the armature. It can be seen that this arrangement has the advantage of requiring less total turns for a given sensitivity than does that shown in Figure 9. The type of seismometer shown in Figure 10 can, as the others, be constructed with the magnets forming the spring-suspended unit and the armature fastened to the case. The magnetic arrangement can also be changed, so long as there are paths for the flux to flow similar to those in Figure 10 and so long as the poles are arranged as shown in that figure.

Figure 11:
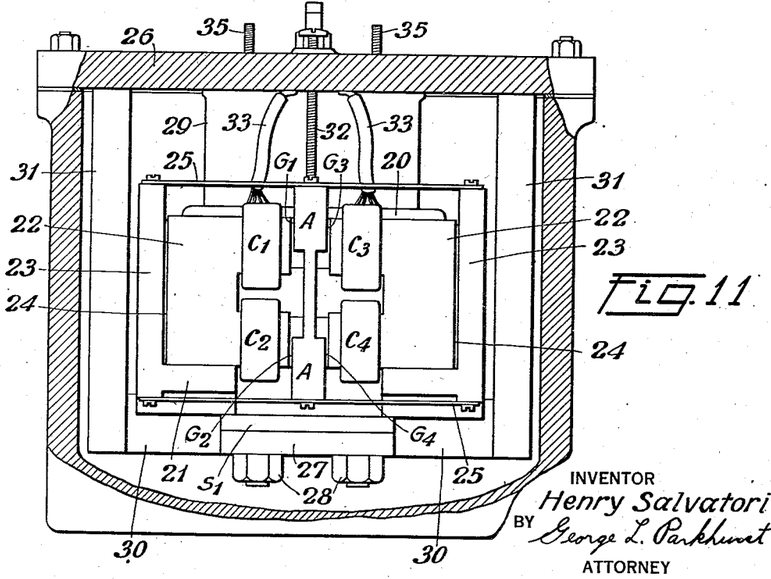
Figure 11 is a front elevational view of a seismometer according to my invention, showing parts broken away.
Figure 12:
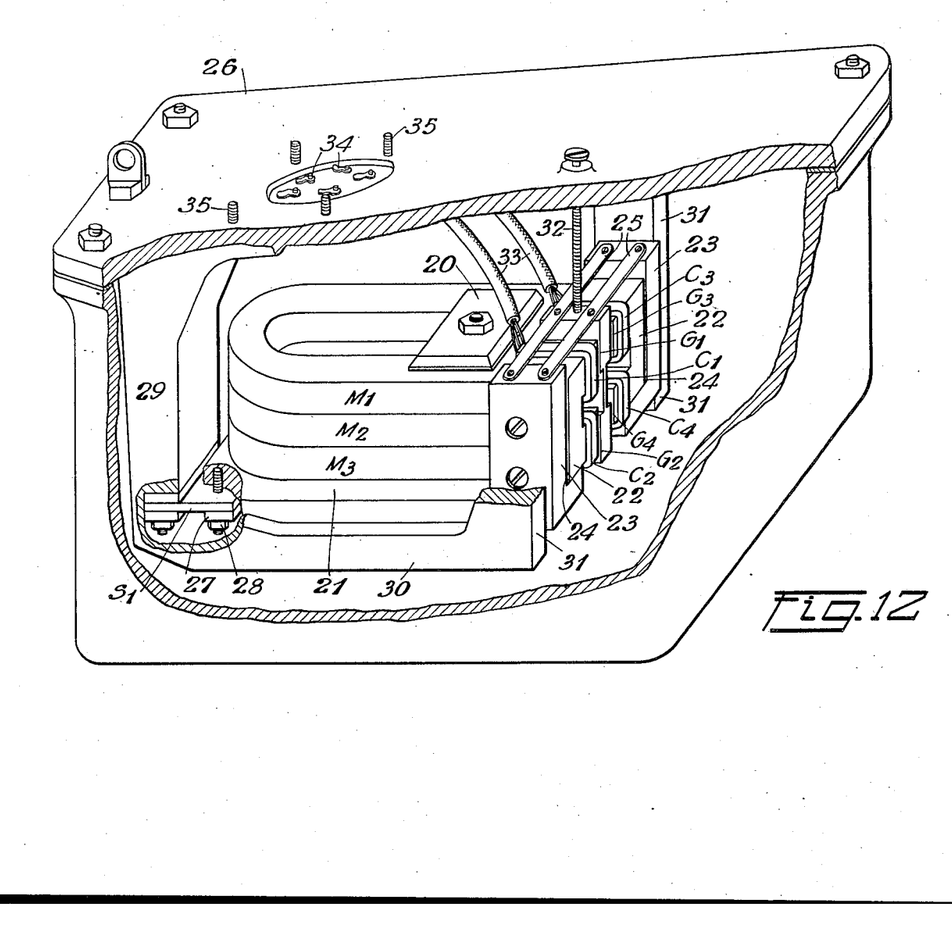
Figure 12 is an isometric view of the seismometer of Figure 11, also showing parts broken away.

A practical seismometer of the type shown diagrammatically in Figure 9 is shown in assembled form in Figures 11 and 12. As shown in these figures, three relatively heavy magnets $M_1$, $M_2$, and $M_3$ are clamped together by means of magnet clamp 20 to a mounting plate 21 which can suitably be made of aluminum. The magnets are butted against two laminated pole pieces 22 shaped like U's placed on their sides with their arms facing each other. These pole pieces carry the pick-up coils $C_1$, $C_2$, $C_3$, and $C_4$. The pole pieces are screwed against two upright pole guides 23 which are preferably integral with the magnet mounting plate 21. Thin shims 24 of a non-magnetic material are placed between pole pieces 22 and pole guides 23 to permit an adjustment of the gaps $G_1$, $G_2$, $G_3$, and $G_4$ between pole pieces 22 and armature A. The armature itself is a light member of magnetic material cut as shown in Figure 11. It is suspended vertically between the two pole pieces by four relatively weak armature springs 25. These springs hold the armature accurately in place between pole pieces 22 and allow practically no horizontal movement.

The magnet mounting plate 21 is suspended indirectly from cover 26 as follows: Plate 21 is fastened to a flat main spring $S_1$ by means of clamp 27 and bolts 28. Spring $S_1$ is likewise fastened to a heavy rigid supporting pillar 29 as shown. To insure rigidity of the supporting pillar, it is cast integral with the cover 26 and with two flanged supporting arms 30 which extend to the front of the seismometer and end in pillars 31 extending to the cover. Part of this structure is broken away in Figure 12. The cover when bolted in place forms part of the seismometer case or frame.

The magnets and mounting, including pole guides and pole pieces form the inertia member, and this assembly tends to remain fixed in space when the case and cover of the seismometer are subjected to a seismic disturbance. However, they do move with respect to the case of the seismometer and are therefore sometimes spoken of as the movable members.

The armature A would also move with this assembly if it were not for the armature adjustment screw 32 which extends down through the cover of the instrument and bears upon the armature with sufficient force to keep the armature springs 25 always in tension, so that no matter what motion is imparted to the pole guides, the armature remains stationary relative to the cover. Because of this arrangement, the ground movement produced by a seismic disturbance sets the cover, case and armature in motion, relative to the magnet and pole piece assembly, and the flux through the coils will change in accordance with the principles already set forth.

It will be seen that this arrangement in which the armature is supported from the magnet assembly and caused to move with the frame or case by means of the adjustment screw 32 has a number of important advantages. Amongst these is the advantage that the adjustment of the gaps between armature and magnets can be made before placing the instrument in the case. The adjustment of the gaps is quite difficult as the magnetic force between elements is large. Furthermore, it is possible to position the fixed element and the movable element with respect to each other far more accurately when one is supported from the other than when they are independently supported from the case. The adjusting screw 32 not only causes the armature A to move with the case but also serves as a means for adjusting the vertical position of the armature with reference to the magnetic poles.

The case of the instrument is preferably filled with oil for damping purposes. The coils are connected through leads 33 to terminals 34 on the cover of the seismometer. These terminals can be covered by a terminal cap (not shown) which can be removably attached to the cover by means of studs 35. From this terminal cap lead wires pass to the amplifying and recording instruments as in the usual practice. The coils are connected in such a way that the electric impulses produced in the coils are additive throughout the circuit. Alternative coil connections can be provided.

It should be noted that this is but one of many types of seismometer which could be built upon the constant length of gap principle, and that there is no intention of the inventor to limit the scope of his patent to any specific feature of the instrument shown in Figures 11 and 12. The multiple type of instrument shown diagrammatically in Figures 7 and 8 could be used with equal ease in the design shown as could seismometers of the types shown in Figures 6 and 10. A more sensitive form of my instrument has been constructed using pole and armature faces cut as shown in Figure 8, to secure greater sensitivity of operation. Other forms within the scope of my invention will no doubt occur to those skilled in the art on reading this specification.

The seismometers illustrated are arranged to be affected by the vertical component of motion to which they are subjected. This is desirable in seismic surveying by the reflection method. However, it will be understood that seismometers in accordance with my invention can be used to detect horizontal motions or motions in any desired plane.

To recapitulate: The constant-length variable-area gap seismometer possesses the following definite advantages: First and most important, the armature cannot stick to the pole pieces, even if a very weak spring suspension is used. Second, due to this fact a very low natural frequency of inertia elements can be secured by the use of a weak spring and a heavy mass. Third, the natural frequency is affected very little by the magnetic pull between elements. Fourth, the reluctance of the magnetic circuit can be made much lower than with the variable length of gap type. Fifth, the flux density of the pole faces tends to be constant throughout the motion. Sixth, with the multiple type, it is possible to decrease the ratio of inductance of the coils to output potential to a lower figure than with the prior art types of electromagnetic seismometer.

While I have described my invention in connection with certain specific embodiments thereof and in connection with certain theories, it is to be understood that these are merely by way of illustration and that I am not limited thereby but only by the appended claims which should be construed as broadly as the prior art will permit.

I claim:

1. A device for detecting the movement of material in contact therewith, including a frame, means carried by said frame defining a magnetic circuit of variable reluctance, said means comprising a first member of magnetic material and an inertia member of magnetic material adjacent said first member, at least one of said members comprising a magnet, means causing said first member to move in unison with said frame, said members having spaced, juxtaposed, substantially parallel faces each overlapping the other and defining at least one gap therebetween, and means effective to constrain said inertia member to a path causing the spaced juxtaposed overlapping faces to move substantially parallel to each other in response to the movement of material in contact with said frame thus causing said gap to vary in area without varying in length to produce a change in the reluctance of said gap, and an electric circuit coupled with said magnetic circuit.

2. A seismometer for detecting the movement of material in contact therewith including a frame, means carried by said frame defining a magnetic circuit of variable reluctance, said means comprising a first member of magnetic material and an inertia member of magnetic material adjacent said first member, at least one of said members comprising a magnet, means causing said first member to move in unison with said frame, said members having spaced, juxtaposed, substantially parallel faces each overlapping the other and defining at least one gap therebetween, a spring suspension for said inertia member, said spring suspension being flexible in a plane substantially parallel to said faces and inflexible in a plane substantially perpendicular thereto, thus producing a constant length, variable area gap, and an electric circuit coupled with said magnetic circuit.

3. A seismometer comprising a frame, a magnetic circuit of variable reluctance comprising two magnetic members having juxtaposed faces each overlapping the other, defining at least one gap therebetween, a rigid connection between one of said members and said frame, a resilient support conecting the other of said members and said frame for restricted relative movement of said two members in a direction parallel to said juxtaposed faces, and an electrical circuit linked with said magnetic circuit.

4. A seismometer comprising a frame, a magnetic circuit, said magnetic circuit including a member rigidly mounted to move with said frame and an inertia member, means resiliently supporting said inertia member, each of said members having faces disposed adjacent to and substantially parallel to opposed faces of the other of said members, said faces each overlapping the other said faces defining gaps therebetween, said resilient supporting means being effective to confine the relative motion between said faces to a plane substantially parallel to said faces and to restrain relative motion between said faces in a direction perpendicular to said plane, thereby producing constant-length, variable-area gaps, and an electrical circuit coupled with said magnetic circuit.

5. A seismometer comprising a frame, a magnetic circuit, said magnetic circuit comprising a member of magnetic material mounted to move with said frame and an inertia member of magnetic material, one of said members comprising a magnet terminating in a pair of pole pieces, the other of said members being disposed adjacent to but normally partly out of line with said pole pieces, juxtaposed faces of said pole pieces and of said other member being effective to define a pair of gaps in said magnetic circuit, means comprising a resilient support for said inertia member, said means being effective in response to movements of said frame to confine the movement of said inertia member to a path maintaining said juxtaposed faces at a substantially constant distance from each other, said resilient support and said gaps being so proportioned that the effective cross-sectional areas of said gaps are never normally reduced to zero and never normally reach the maximum possible value, and an electric circuit electromagnetically coupled with said magnetic circuit.

6. A seismometer including a frame, a magnetic circuit comprising a first member of magnetic material mounted to move with said frame and a second member of magnetic material mounted adjacent said first member as an inertia member, each of said members having a juxtaposed face substantially parallel to a face of the other of said members and each face overlapping the other, at least one of said members including a magnet, the other of said members including an armature, a spring suspension for said inertia member, said spring suspension being flexible in a plane substantially parallel to said faces and inflexible in a plane substantially perpendicular thereto providing for movement of said inertia member relative to said first member while maintaining said faces a substantially constant distance apart, said faces defining at least one gap therebetween, the area defined by the projection of the directly opposed portion of each of said faces on the other being varied by the movement of said inertia member relative to said first member between zero as a lower limit and the total area of one of said faces as an upper limit, and an electric circuit coupled with said magnetic circuit.

7. In a seismometer, a frame, a magnetic circuit of variable reluctance, said magnetic circuit comprising a first member of magnetic material mounted to move with said frame, a second member of magnetic material, resilient means suspending said second member from said frame for restricted movement relative to said first member in response to the movement of said frame, one of said members being further characterized by at least two pairs of magnet poles, the other of said members being further characterized by an individual armature member for each of said pairs of poles, said suspending means confining each of said armature members to a path of movement effective to maintain the same partially but never completely out of line with its corresponding pair of poles and at a substantially constant distance therefrom, and an electric circuit coupled with said magnetic circuit.

8. In a seismometer, a frame, a magnetic circuit including a first member comprised of magnetic material mounted to move with said frame, a second member comprised of magnetic material and positioned adjacent said first member as an inertia member, one of said members including at least two pairs of magnet poles having fixed positions relative to each other, the other of said members including a like number of armature elements in fixed relation to each other, one for each of said pairs of magnet poles, resilient supporting means for said other of said members effective to position one armature element between but slightly out of alignment with each of said pairs of magnet poles for movement relative thereto and at a substantially constant distance therefrom in response to the movement of said frame, and an electric circuit coupled with said magnetic circuit.

9. A seismometer comprising a frame, a magnetic circuit, said magnetic circuit including a first member rigidly mounted to move with said frame, a second member resiliently supported by said frame, one of said members being a magnet terminating in two pairs of poles, the other of said members including two armature elements, one mounted respectively between each of said two pairs of poles, the center lines of said two armature elements being disposed on opposite sides of the respective center lines of said two pairs of poles, means supporting said armature elements for simultaneous movement relative to said poles while maintaining the same at a substantially constant distance therefrom, the center line of one armature approaching alignment with the center line of its corresponding magnet poles while the center line of the other armature is moved away from alignment with the center line of its pair of poles, and an electric circuit electromagnetically coupled with said magnetic circuit.

10. A seismometer comprising a frame, a first member mounted to move with said frame, a second member adjacent said first member and mounted as an inertia member, one of said members including two magnets, the other of said members including an armature, said magnets being disposed on opposite sides of said armature with the north pole of each magnet opposite the south pole of the other, one of said magnets forming with one side of said armature a magnetic circuit, adjacent faces of said one magnet and said armature overlapping each other and defining a first pair of gaps on one side of said armature, the other of said magnets forming with the other side of said armature a second magnetic circuit, adjacent faces of said other of said magnets and said armature overlapping each other and defining a second pair of gaps on the other side of said armature, said armature and said magnet being constructed and arranged so that relative motion between said two members increases the cross sectional areas of the gaps of one of said pairs of gaps and decreases the cross sectional areas of the gaps of the other of said pairs of gaps, means resiliently mounting said inertia member for confined movement in a direction parallel to said gap defining faces to maintain said faces a constant distance apart, whereby the changes in the total amount of magnetic flux flowing through said armature are the arithmetical sums of the changes due to the changes in the cross-sectional areas of said two pairs of gaps, and an electric circuit coupled with said magnetic circuits.

11. In a seismometer, a frame, a first member comprised of magnetic material resiliently carried by said frame, a second member comprised of magnetic material resiliently carried by said first member, means for causing said second member to move substantially with said frame, said members defining a magnetic circuit, and an electric circuit coupled with said magnetic circuit.

12. In a seismometer, a frame, a magnet assembly resiliently carried by said frame and forming an inertia member, an armature, resilient means mounting said armature on said magnet assembly for movement relative thereto in response to movements of said frame, means including said resilient means for causing said armature to move substantially with said frame, and an electric circuit for detecting relative motion between said magnet assembly and said armature.

13. A seismometer comprising a frame, a magnet assembly resiliently supported from said frame and including a magnet and a pair of magnet poles, an armature assembly including an armature disposed between said magnet poles, means resiliently supporting said armature assembly from said magnet assembly, an adjusting screw bearing upon said armature assembly and adapted to adjust the position of said armature with respect to said magnet poles, said screw and said resilient supporting means being effective to cause said armature assembly to move in unison with said frame, and an electric circuit coupled with said magnetic circuit comprising the magnet and said armature.

14. A seismometer comprising a frame, a magnet assembly including at least one pair of magnet poles, means for resiliently supporting said magnet assembly from said frame, an armature, means for resiliently supporting said armature from said magnet assembly and for accurately positioning said armature between said magnet poles to form gaps of substantially constant lengths, means including said resilient supporting means for causing said armature to move substantially with said frame when said magnet assembly moves relative thereto for varying the effective cross-sectional areas of said gaps, and an electric circuit adapted to detect variations in the effective cross-sectional areas of said gaps.

15. A seismometer comprising a case, a magnet assembly mounted as an inertia member and including a magnet and a pair of pole pieces, an armature suspended between said pole pieces, springs connecting said armature and said pole pieces, an adjusting screw passing through said case and adapted to adjust the position of said armature with respect to said pole pieces in opposition to said springs thus causing said armature assembly to move in unison with said case, and an electric circuit coupled with the magnetic circuit comprising said magnet assembly and said armature.

16. A seismometer comprising a case, a magnet assembly mounted as an inertia member and including a magnet and a pair of pole pieces forming at least two pairs of magnet poles, an armature assembly including an armature element suspended between each of said two pairs of poles in partial alignment with said poles, said armature elements and said poles defining gaps therebetween, means for supporting said armature assembly resiliently from said magnet assembly and for positioning said armature elements between said pole pieces, means including said resilient supporting means for causing said armature assembly to move with said case and for adjusting the normal areas of said gaps, and an electric circuit electromagnetically coupled with said magnetic circuit.

17. A seismometer according to claim 16 in which said armature elements are normally disposed in a symmetrical fashion with respect to the magnetic poles to which they respectively relate, whereby the component of magnetic force in the direction of the relative motion between said armature elements and said pole pieces is minimized.

HENRY SALVATORI.

CERTIFICATE OF CORRECTION.

Patent No. 2,111,643.  March 22, 1938.

HENRY SALVATORI.

It is hereby certified that error appears in the printed specification of the above numbered patent requiring correction as follows: Page 8, second column, line 6, claim 13, for the word "said" read the; and line 7, same claim, for "the" read said; and that the said Letters Patent should be read with these corrections therein that the same may conform to the record of the case in the Patent Office.

Signed and sealed this 10th day of May, A. D. 1938.

(Seal)

Henry Van Arsdale,
Acting Commissioner of Patents.